May 21, 1968 W. R. HAAS 3,383,875
CONDUIT FOR CRYOGENIC FLUIDS
Filed Aug. 17, 1966 2 Sheets-Sheet 1
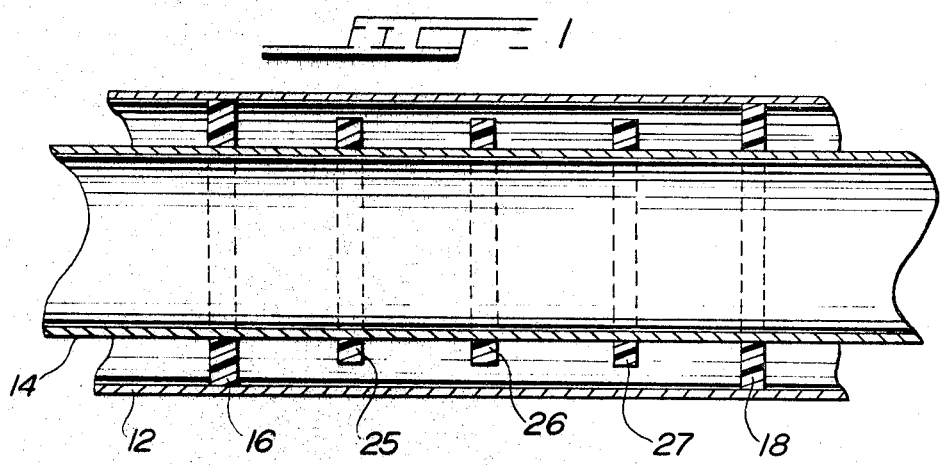
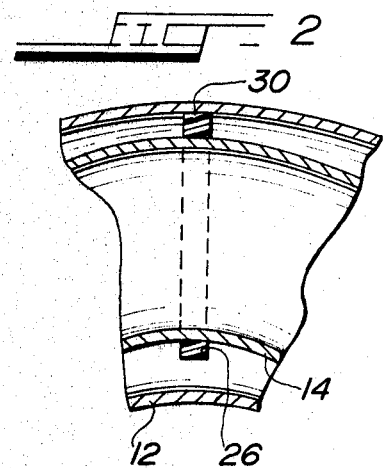
INVENTOR.
WILLARD R. HAAS

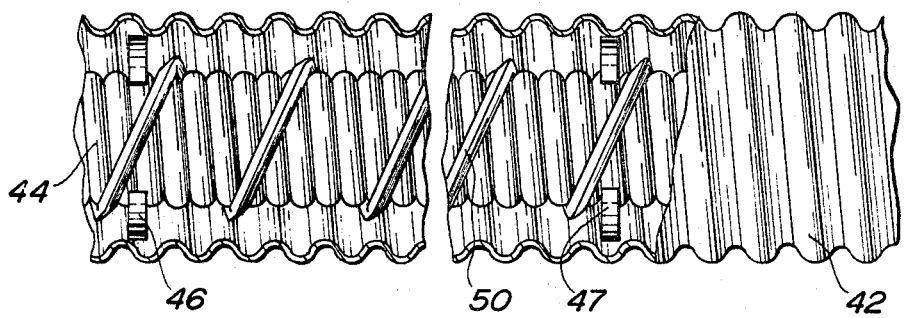
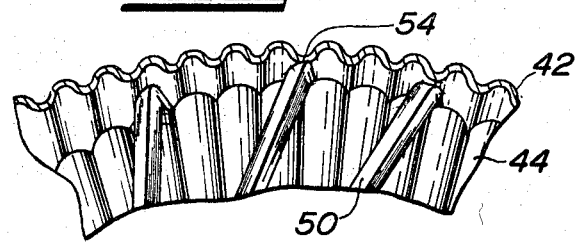
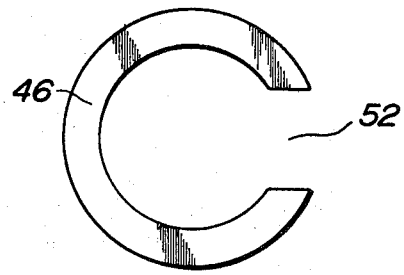

United States Patent Office

3,383,875
Patented May 21, 1968

3,383,875
CONDUIT FOR CRYOGENIC FLUIDS
Willard R. Haas, Tinley Park, Ill., assignor to Andrew Corporation, Orland Park, Ill., a corporation of Illinois
Filed Aug. 17, 1966, Ser. No. 572,939
12 Claims. (Cl. 62—55)

ABSTRACT OF THE DISCLOSURE

The flexible cryogenic line is of the type having coaxial tubes separated by radial support means to form an insulating gap. Auxiliary radial support means of lesser radial extension are provided between successive spaced main support points. Heat transfer occurs through the auxiliary supports in regions of sharp bends and other deformations, but is elsewhere limited to the main supports.

---

The present invention relates to conduit or "transfer line" for cryogenic fluids and particularly to flexible cryogenic conduit of high thermal insulation characteristics.

In the handling of cryogenic fluids such as liquid oxygen, liquid hydrogen, etc., very high thermal insulation from ambient temperatures is an obvious requirement. Some constructions for conduit frequently employed for such purposes generally resemble hollow-inner-conductor coaxial lines used for the transmission of high frequency electrical energy, since, as is well known, materials and structures which provide good electrical insulation generally also provide good thermal insulation. Like high-power low-dielectric-constant coaxial transmission line, cryogenic transfer line may employ two concentrically disposed tubes having an annular space therebetween. With this space evacuated, there is provided an extremely high degree of insulation with properly designed supporting means distributed longitudinally along the line.

In such constructions, substantially the entire heat transfer between the outer and inner tubes takes place by conduction through the supporting means rather than by convection and radiation through the evacuated annular space. In the most efficient types of construction, the contact areas between the support structure and the inner and outer tubes are kept sufficiently small so that the rate of heat conduction depends only secondarily on the thermal insulation properties of the materials of which the supporting members are constructed and primarily on the area of contact which defines the principal component of the resistance to heat flow. In such constructions, the desired high insulation is relatively independent of the length of the heat-flow path through the support, so that the insulating annulus may be relatively thin, thus providing a minimum overall size for any given cross-sectional size of the fluid-bearing tube.

To minimize the total contact area available for heat transfer or conduction between the inner and outer tubular members, the supports are of course spaced at the maximum interval consistent with reliably preventing contact between the tubes.

In one adaptation of high-frequency coaxial electrical transmission line structure to cryogenic transfer line use, the support structure for the center tube is a continuous strip of an insulating material such as polyethylene or polytetrafluoroethylene ("Teflon"), extending helically through the annulus, thus providing spaced support means along the length of each longitudinally extending circumferential portion of the line. In this type of structure, the helix pitch determines the longitudinal spacing between the support points along each circumferential region. Such transfer line is currently commercially manufactured in a flexible form employing corrugated copper inner and outer tubing, the pitch of the helical insulator strip being maximized to the extent consistent with assurance against contacting of the inner and outer corrugated tubes, and the corrugations of the tubing aiding in minimizing the contact area between the strip and the respective tubes.

As will readily be seen on study, the permissible length of the helix pitch in this construction, like the spacing of discrete supports in other constructions, is closely interrelated with the radial size of the annulus, i.e., for any given cross-sectional size of the central or inner tube, the permissible pitch length of the helical insulator increases with the size of the outer tube. For any given annulus, the pitch or support spacing permitted is in general reduced by the design of the line for high flexibility, both because of the transverse deformations which can occur in bending and because of the impairment of resistance to denting and similar distortion which is in general associated with the thin walls used to facilitate bending of the line.

For these reasons, it was, prior to the present invention, generally considered that substantial sacrifice of efficiency must be accepted in flexible line construction as compared with rigid line construction, either by acceptance of diminished insulator support spacing (helix pitch of the insulating strip) and thus diminished insulation, or by increase of the annulus outer radius and thus increase of overall size, for any given flow-path cross-section.

The present invention stems from the recognition that the desired flexibility of vacuum-jacketed cryogenic lines can be provided without increased heat leakage or increased size by utilizing radial support means of different radial extension between the inner and outer flexible tubular members, the principal support means extending radially across the entire annulus and being longitudinally spaced at relatively long intervals (a long pitch in the case of a helix) in a manner adequate to provide the required security against touching of the tubes in the normal straight condition, and auxiliary support means of lesser radial extension being interposed at shorter intervals (short pitch in the case of a helix) and providing the security against touching of the tubes in the highly flexed or otherwise distorted condition, but being essentially inert as regards heat transfer except at the points of the line which are so flexed or distorted.

The invention, in its preferred form, employs a flexible cryogenic transfer line construction wherein two concentrically disposed corrugated metal tubular members, for example of copper, are spaced apart by means of a set of main supports, such as plastic C-rings, which are in direct contact with the outer surface of the inner tube and the inner surface of the outer tube at relatively long longitudinally spaced intervals along the line. An auxiliary support, preferably in the form of a helical or spiral strip of thermal insulating material, such as polyethylene, is wound about the outer surface of the inner corrugated metal tube, having a radial extension less than that of the main supports so as to be normally out of contact with the outer corrugated tube, and having a pitch sufficiently small to prevent the two tubes from contacting on flexure or deformation of the line.

With such construction in accordance with the invention, the normal heat transfer between the inner and outer tubes is minimized by the long spacing between the main supports, as in the case of a rigid line; additional heat transfer between the tubes occurs only at portions of the line having bends of small radius, or other deformation, which in general adds relatively little heat transfer because of the small portion of an overall length of line having such a condition in normal installations.

The principle of the improvement of the invention, in its broader aspects, is of course also capable of being applied to other forms of known structures used for the transfer of cryogenic fluids.

The nature and advantages of the invention in its various aspects will be better understood from the following description of the embodiments illustrated in the drawing, wherein:

FIGURE 1 is a view in section of a cryogenic conduit having a simplified form of construction selected to illustrate the principle of the invention;

FIGURE 2 is a more or less schematic fragmentary view of a portion of the conduit of FIGURE 1 in a flexed condition;

FIGURE 3 is a view in elevation, partially broken away in section, of a preferred cryogenic conduit construction made in accordance with the invention;

FIGURE 4 is a fragmentary view, partially in elevation and partially in section, of a portion of the embodiment illustrated in FIGURE 3, in a flexed condition;

FIGURE 5 is a view in side elevation of an insulating support member utilized in the embodiment illustrated in FIGURE 3.

Referring now to FIGURE 1, there is shown a relatively simple construction of a flexible cryogenic conduit, selected for simple illustration and explanation of the principle of the invention. It will of course be understood that the fragment illustrated is only a segment of a long repetitive structure which may be wound in a coil or on a reel. The illustrated conduit has an outer tube 12 coaxially surrounding an inner tube 14, both being composed of a relatively flexible or semi-flexible material. The inner tube 14 is maintained concentrically within the outer tube 12 by a plurality of longitudinally spaced ring spacers or supports 16 and 18 of a suitable material such as Teflon or other insulating polymer.

The spacing or interval between the main supports 16 and 18 is large compared to the annulus thickness to provide minimum heat leakage, the repetition interval between support points so provided being only sufficiently small to maintain a coaxial relation in the substantially straight or normal condition of the line. That is, the longitudinal spacing between each of the support members 16 and 18, etc. along the length of the line is made as large as possible consistent with the prevention of contact between the inner tube 14 and the outer tube 12 when the line is in its straight condition. The maximum longitudinal spacing of these main supports is of course determined by the thickness of the annulus and the rigidity of the tube walls, the design parameters of this portion of the support structure being thus generally similar to those of rigid line, where allowance for flexure is not required and spacings are relatively large as compared with those heretofore used in flexible line.

Contact between the tubes due to flexing or denting is prevented, in accordance with the invention, by a auxiliary set of support rings shown in FIGURES 1 and 2 as 25, 26 and 27. The radial extension of these support rings, which are normally in contact with only the outer surface of the inner tube 14, is less than that of the main supports and each auxiliary ring is normally substantially inert as regards heat leakage between the tubes, merely producing a slight increase in the heat capacity of the insulation and thus a slight increase in the time to reach thermal equilibrium after a cryogenic fluid is introduced into the inner conduit.

On bending or flexure of the line, producing internal eccentricity as shown in FIGURE 2 because of the long spacing of the main supports, direct contact between the tubes is prevented by the auxiliary support ring 26 located midway between the main support rings 23 and 24. The contact between the outer tube 12 and the auxiliary supports, for the case illustrated in FIGURE 2, takes place at 30 on the side of the line opposite to the center of curvature of the bend; however the occurrence of contact between the auxiliary support ring and the outer conduit may of course be on the same side of the line as the center of curvature of the bend depending on the particular bending properties of each of the conduits and the amount of slippage or "play" at the main supports.

The additional auxiliary support rings 25 and 27 are provided between the center auxiliary support ring 26 and each of the oppositely adjacent main support rings 23 and 24 to prevent contact between the tubes 12 and 14 due to more extreme deformation than that shown or to crushing or deformation of the outer conduit or nonuniform bending of the line. The number of additional auxiliary support rings such as 25 and 27 used in the construction of such conduit depends primarily on the rigidity and pliability of the tubular walls, the radial distance between the concentric tubes, and the distance between the main support rings, both the maximum permitted spacing of the main supports and the maximum permitted spacing of the auxiliary supports being determined by simple experiment for any given tubing design.

Referring now to FIGURES 3, 4 and 5, there is shown an embodiment of the present invention applied to a form of flexible line which is well suited for commercial manufacture. The fragment of conduit illustrated in these figures has an outer tube 42 coaxially surrounding an inner tube 44, both being helically corrugated copper tubing. The inner tube 44 is supported in concentric relation to the outer tube 42 by a plurality of discrete longitudinally spaced C-rings 46 and 47 of a material such as earlier mentioned, preferably sufficiently hard to produce line contact with the corrugations of both tubes.

The annular insulating space between the two concentric tubes is preferably continuously pumped in use to a vacuum of at least the order of $10^{-4}$ torr (mm. Hg absolute) and utilization of bright reflecting copper surfaces on the tubing is desirable to minimize heat gain by radiation.

An auxiliary spacer or support 50 is provided in the form of a spiral or helical strip of polyethylene or "Teflon" wound about the outer surface of the inner tube with a pitch substantially longer than the pitch of the corrugated tubing. The auxiliary support 50 has a radial extension which is sufficiently less than the radial distance between the inner and outer tubes so that it does not contact the inner surface of the outer tube when the conduit is unflexed.

Slots 52 (FIGURE 5), provided in each of the C-ring supports, are adapted in size and position to pass turns of the auxiliary helical support and have a sufficiently large gap-width to provide ample clearance on both sides of the auxiliary helical support passing therethrough. Direct physical contact between the C-rings and the helix is avoided since such contact would create a substantial additional heat-flow path between the bodies of the C-rings and the inner tube 44.

The spacing or interval between the main support rings 46 and 47 is large compared to the annulus thickness, and is based on the same general considerations as already discussed in connection with FIGURES 1 and 2.

The helically convoluted or corrugated tube construction here provides the desired flexibility of the line. The helical auxiliary support prevents the direct contact between the inner and outer tubes which would otherwise essentially destroy the insulating properties of the line upon relative displacement of the tubes 42 and 44, or other distortion of the annulus, due to bending or other deformation, in the same general manner as the auxiliary supports of FIGURES 1 and 2.

Although the strip 50 is generally considered a thermal insulator, as previously indicated, its insulating properties are of course far less than those of the vacuum jacket and thus the contact between strip 50 and the outer tube 42 at 54, as shown in FIGURE 4, increases the heat leakage from the outer to the inner tube at this point. But the heat leakage in the remainder of the line remains unaffected and the overall increase in heat leakage due to bending or denting, or even crushing, of a small portion of a long line is negligible as compared with the heat flow produced with insulator supports of uniform radial extension as heretofore used, when designed to serve the purpose here served by the auxiliary insulating support. It will also be observed that the presence of the auxiliary support helix has very little effect on the ease of bending the line.

The number of convolutions of the helix per spaced interval of the main support members is selected on general considerations analogous to those already discussed for the discrete auxiliary support rings 25 and 27 of FIGURES 1 and 2, again preferably optimized by simple experiment.

The corrugated tubing which is utilized for the inner and outer conduits is preferably of the type made from continuous copper strip by means of machinery which provides a continuous welded seam along the length of a formed tubular structure, the helical corrugations then being produced. Such corrugated copper tubing, as in prior art constructions, may desirably have a helical corrugation pitch of approximately 0.5 to 0.7 inch, a wall thickness of approximately 0.02 to 0.03 inch, and a corrugation depth of approximately 0.15 to 0.25 inch, with tube diameters ranging from about 1½ to about 5 inches.

The support structure, as in prior constructions, is desirably installed about the inner tube after it is corrugated and the outer tube is then formed thereon, welded and corrugated.

One example of a cryogenic line constructed in accordance with the invention utilizing such corrugated tubing has an inner tube of approximately 1¾ inch diameter, a helical auxiliary insulating strip wound about the inner tube with a length of pitch of approximately 5 inches, and discrete main support C-rings placed along the length of the tube at intervals of approximately 7 times the pitch of the helical strip or about 35 inches.

An outer corrugated tube of approximately 3 inch diameter is then formed over the assembly in contact with only the main supports, the radial extension of the auxiliary support being roughly one-half that of the main supports.

Of course, a number of variations on the preferred embodiment of FIGURES 3 through 5 may be made without departing from the principle of the construction. For example, further reductions in contact area may be made if desired by forming the main supports in polygonal shape instead of the generally circular form shown. The C-ring support shown in FIGURE 5 may be made hexagonal, for example, both along its outer perimeter and along its inner perimeter, the flats being arranged so as to minimize the maximum radial extension required to maintain the necessary supporting strength. Likewise, supports having radial posts which make small area point contact with the tubes may be used as well as other more complex forms of support, if so desired.

Similar considerations are applicable to the form of the auxiliary support member which may, of course, be continuously helical as shown in FIGURES 3 and 4, having rectangular, triangular or other cross-section, or on the other hand, may comprise a plurality of discrete support members such as those shown in FIGURES 1 and 2. Also, by employing suitable constructions, both the main and the auxiliary supports may be helically disposed through the annulus.

Furthermore, it is not necessary to the practice of the invention that the supports be composed of material ordinarily considered to be thermal insulation; in constructions providing sufficiently small contact areas between the support points and the tubular members, the material of the main or auxiliary support may be a metal.

It will be obvious to persons skilled in the art that the embodiments herein illustrated and described, although each having certain advantages, represent specific forms of practice of the broad teachings of the invention and that a multitude of variants will be apparent from an understanding of the above description. Accordingly, the scope of the patent protection afforded the invention should not be limited by the particular embodiments herein discussed, but should extend to all practice of the teachings of the invention as described in the appended claims, and equivalents thereof.

What is claimed is:

1. A flexible cryogenic transfer line comprising:
   (a) inner and outer elongated bendable tubular members,
   (b) main radial support means along the interior of the outer member in contact with the outer surface of the inner member and the inner surface of the outer member to maintain the spacing of the members in the straight condition of the line, contact with at least one of said surfaces along the length of any longitudinally extending circumferential portion of the line being only at points spaced by substantial successive intervals, and
   (c) auxiliary radial support means between said spaced points having a smaller radial extension than the main support means to be normally out of contact with said one surface, so that the auxiliary support means is contacted by said surface only in the region of sharp bends and other deformations.

2. A transfer line according to claim 1 wherein contact between the main radial support means and both of said surfaces along the length of any longitudinally extending circumferential portion of the line is only at substantially spaced points.

3. A transfer line according to claim 1 wherein said main radial support means and said auxiliary radial support means are each in contact with the same one of said surfaces only at spaced points distributed along the length of any longitudinally extending circumferential portion of the line.

4. A transfer line according to claim 1 wherein at least one of said bendable members comprises helical corrugated tubing.

5. A transfer line according to claim 1 wherein said auxiliary radial support means comprises a spacer helically disposed about said inner tubular member.

6. A transfer line according to claim 5 wherein the length of the pitch of said auxiliary helical spacer is less than the spacing between successive contact points of the main support means along the length of any longitudinally extending circumferential portion of the line.

7. A transfer line according to claim 1 wherein the radial distance between the inner surface of the outer member and the outer surface of the inner member is substantially less than the spacing between the contact points of the main support means along the length of any longitudinally extending circumferential portion of the line.

8. A transfer line according to claim 1 wherein said main radial support means comprises discrete spacers and said auxiliary radial support means comprises a continuous helical spacer about said inner tubular member having a pitch of length less than the longitudinal distance between successive discrete spacers.

9. A transfer line according to claim 8 wherein the discrete spacers are free from contact with said continuous helical spacer.

10. A transfer line according to claim 8 wherein the discrete spacers are generally C-shaped, the gap of the C passing the helical spacer therethrough without contact therewith.

11. A transfer line according to claim 1 wherein said main radial support means and said auxiliary radial support means are free from contact with each other.

12. A flexible cryogenic transfer line comprising:
   (a) inner and outer elongated tubular members having a helical corrugated surface;
   (b) main radial support means between said members distributed circumferentially and longitudinally and contacting both said members at relatively small-area contact regions spaced along the length of any longitudinally extending circumferential portion of the line; and (c) helical auxiliary radial support means disposed between said tubular members and having a smaller radial extension than said main support means, said helical auxiliary support means being out of contact with at least one of said members when the line is straight and blocking contact between said members in the region between said longitudinally spaced small-area contact regions when the line is fully flexed, the length of the pitch of said helical support being greater than the pitch of said helical corrugated tubular members.

References Cited
UNITED STATES PATENTS

| | | | |
|---|---|---|---|
| 2,131,987 | 10/1938 | Studt et al. | 138—148 |
| 2,722,105 | 11/1955 | Keyes | 62—55 |
| 2,871,670 | 2/1959 | Huzel et al. | 62—55 |
| 3,137,143 | 6/1964 | Jacobs et al. | 62—55 |
| 3,240,234 | 3/1966 | Bond et al. | 138—122 |

LLOYD L. KING, *Primary Examiner.*